(12) United States Patent
Kelty et al.

(10) Patent No.: US 6,690,884 B1
(45) Date of Patent: Feb. 10, 2004

(54) OPTICAL TRANSMISSION SYSTEMS INCLUDING ERROR CORRECTION AND PROTECTION APPARATUSES AND METHODS

(75) Inventors: Mark A. Kelty, Catonsville, MD (US); James I. McGuire, III, Gaithersburg, MD (US); Dharmesa B. Jani, Columbia, MD (US)

(73) Assignee: Corvis Corporation, Columbia, MD (US)

(*) Notice: Subject to any disclaimer, the term of this patent is extended or adjusted under 35 U.S.C. 154(b) by 0 days.

(21) Appl. No.: 09/506,787

(22) Filed: Feb. 18, 2000

Related U.S. Application Data
(60) Provisional application No. 60/177,622, filed on Jan. 24, 2000, and provisional application No. 60/120,698, filed on Feb. 19, 1999.

(51) Int. Cl.$^7$ .......................... H04B 10/00; H04B 10/08
(52) U.S. Cl. ....................... 398/27; 714/704; 714/708; 359/158
(58) Field of Search ................................ 714/704–708; 359/110, 174, 177

(56) References Cited

U.S. PATENT DOCUMENTS

| | | | |
|---|---|---|---|
| 3,078,443 A | | 2/1963 | Rose |
| 4,755,993 A | | 7/1988 | Grover |
| 5,408,348 A | | 4/1995 | Pamart et al. |
| 5,574,717 A | | 11/1996 | Tomizawa et al. |
| 5,606,725 A | * | 2/1997 | Hart ............... 725/131 |
| 5,615,221 A | | 3/1997 | Karp et al. |
| 5,703,409 A | * | 12/1997 | Fukumitsu et al. ......... 714/704 |
| 5,896,391 A | * | 4/1999 | Solheim et al. ............ 714/704 |
| 5,930,273 A | | 7/1999 | Mukojima |
| 6,008,935 A | * | 12/1999 | Fujita et al. ............. 359/341.4 |
| 6,148,423 A | | 11/2000 | Le Mouel et al. |
| 6,182,264 B1 | * | 1/2001 | Ott ............... 714/774 |
| 6,229,631 B1 | * | 5/2001 | Sato et al. ............ 359/110 |
| 6,275,959 B1 | * | 8/2001 | Ransijn ............ 714/705 |
| 6,330,278 B1 | * | 12/2001 | Masters et al. ............ 375/223 |
| 2002/0061073 A1 | * | 5/2002 | Huang et al. ............ 375/295 |

FOREIGN PATENT DOCUMENTS

| | | |
|---|---|---|
| EP | 0 188 271 B1 | 7/1986 |
| EP | 0 580 497 B1 | 1/1994 |
| EP | 0 580 497 A1 | 1/1994 |
| EP | 0 954 108 A1 | 11/1999 |
| WO | WO 99/21316 | 4/1999 |

OTHER PUBLICATIONS

Agrawal, Govind P. Fiber–Optic Communication Systems (second edition). John Wiley and Sons, Inc. (pp. 170–172).*

M. Sherif, P.A. Davies. Decision–point steering in optical fibre communication systems: theory. IEE Proceedings, vol. 136, Pt. J, No. 3, Jun. (1989). (pp. 169–176).*

(List continued on next page.)

*Primary Examiner*—Leslie Pascal
*Assistant Examiner*—Sherif R Fahmy

(57) ABSTRACT

The present invention addresses the need for optical transmission systems, apparatuses, and methods having increased flexibility and reliability. Optical systems of the present invention are configured to provide alarms, provision, and/or perform protection switching, if the number of corrected errors exceeds a threshold criteria. Various system parameters, in addition to protection thresholds, can be adjusted based on the relationship between the number of one errors, zero errors, and/or total errors being corrected in the system.

5 Claims, 3 Drawing Sheets

OTHER PUBLICATIONS

Gabla, P.M, et al., "401 km, 622 Mb/s and 357 km, 2.488 Gb/s IM/DD Repeaterless Transmission Experiments Using Erbium–Doped Fiber Amplifiers and Error Correcting Code", IEEE Photonics Technology Letters, vol. 4, No. 10, Oct. 1992, pp. 1148–1151.

Yamabayashi, M., et al., "Bit–Interleaved Hamming Code For Linearly Repeatered Terrestrial SDH Transmission Systems", Electronics Letters, Apr. 13$^{th}$ 1995, vol. 31, No. 8, pp. 608–609.

Sian, S., et al., "40Gbit/s (16×2.5 Gbit/s) Unrepeatered Transmission Over 427km", Electronics Letters, Jan. 4$^{th}$ 1996, vol. 32, No. 1, pp. 50–51.

Tomizawa, K., et al., "STM–64 Linearly Repeatered Optical Transmission Experiment Using Forward Error Correcting Codes", Electronics Letters, Jun. 8$^{th}$ 1995, vol. 31, No. 12, pp. 1001–1003.

Yamabayashi, Y, et al., "Line Terminating Multiplexers for SDH Optical Networks", Journal of Lightwave Technology, vol. 11, No. 5/6, May/Jun. 1993, pp. 875–881.

Grover, W., et al.; "Design and Characterization of an Error–Correcting Code For The Sonet STS–1 Tributary", IEEE Transactions On Communications, Apr. 4, 1990, vol. 38, pp. 467–476.

Moro, P., et al., "565 Mb/s Optical Transmission System For Repeaterless Sections Up To 200 km", ICCC '91, pp. 1217–1221.

Takasaki, Y., "Multipled Block Codes for All–Optical Transports", Journal of Lightwave Technology, May/Jun. 1993, vol. 11, No. 5/6, pp. 829–835.

Shao, S., et al., "WDM Coding for High–Capacity Lightwave Systems", Journal Of Lightwave Technology, Jan. 1994, vol. 12, No. 1, pp. 137–148.

Tomizawa, M., et al., "Forward Error Correcting Codes in Synchronous Fiber Optic Transmission Systems", Journal Of Lightwave Technology, Jan. 1997, vol. 15, No. 1, pp. 43–51.

Lemaire, V., et al, "Forward Error Correcting Code At 591 MBIT/S In Direct Detection And Heterodyne DPSK Systems", 17$^{th}$ European Conference on Optical Communication ECOC '91, Sep. 9–12, 1991, Paris France, pp. 465–468.

Paxal, V. et al., "Error–Correction Coding For High–Speed Optical Transmission Systems Based on the Sychronous Digital Hierarchy", European Transactions On Telecommunications , vol. 4, No. 6, Nov.–Dec. 1993, pp. 623–628.

"Optical Interfaces for Equipments and Systems Relating to the Synchronous Digital Hierarchy" Telecommunication Standardization Sector of International Telecommunication Union, G.3957 (07/95).

* cited by examiner

OPTICAL TRANSMISSION SYSTEMS INCLUDING ERROR CORRECTION AND PROTECTION APPARATUSES AND METHODS

CROSS-REFERENCE TO RELATED APPLICATIONS

This application is a continuation-in-part ("CIP") of commonly assigned U.S. Provisional Application No. 60/177,622 filed Jan. 24, 2000, and a CIP of commonly assigned U.S. Provisional Application No. 60/120,698 filed Feb. 19, 1999, both of which are incorporated herein by reference.

STATEMENT REGARDING FEDERALLY SPONSORED RESEARCH OR DEVELOPMENT

Not Applicable

BACKGROUND OF THE INVENTION

The present invention is directed generally to optical transmission systems. More particularly, the invention relates to optical transmission systems including error correction and protection capability for use in optical communication systems.

Optical transmission systems employ optical transmitters to transmit information as optical signals via guided or unguided transmission media, typically optical fiber, to optical receivers. The optical fiber attenuates the optical signals and accumulates optical noise resulting from signal attenuation and other degradation mechanisms, such as non-linear effects, which degrades the quality of the optical signals during transmission.

The distance that the transmitters and the receivers can be separated in a transmission system depends upon the amount of signal degradation that occurs during transmission. The amount of signal degradation and the resulting number of errors that occur in the optical signal depends upon the relative intensities of the optical signal and the noise in the system, known as the optical signal to noise ratio ("OSNR").

Optical amplifiers can be distributed along the transmission fiber to extend the distance between transmitters and receivers by amplifying the signal intensity to overcome signal attenuation in the fiber. However, optical amplifiers also amplify the optical noise in the fiber, which continues to accumulate in the transmission fiber and is amplified at successive amplifiers, further degrading the OSNR during transmission.

The accumulation of noise in optical systems often requires that the optical signals be regenerated along the transmission path between the origin and the destination before signal degradation introduces an unacceptable number of errors into the optical signals. Optical signal regeneration generally is performed by receiving and converting the optical signals into electrical signals. The electrical signals are processed, such as by retiming, reshaping, amplifying etc., to eliminate signal distortion introduced by the various degradation mechanisms in the transmission fiber. The regenerated electrical signals can then retransmitted as optical signals.

The transmitters, receivers, and associated equipment required to regenerate signals are often one of the largest component expenses in the optical system and along with the required real estate and facilities comprise a substantial portion of the optical system startup and operating costs. As such, it is desirable to extend the distance between transmitters and receivers to decrease the overall system cost, without further degrading the performance of the system.

Forward error correction ("FEC") has been used to extend the distance between the transmitters and receivers without incurring a commensurate increase in the error rate and decrease in the quality of service. FEC is implemented by encoding the information to be transmitted, such that the information can be decoded upon receipt and the decoding process will correct a limited number of errors introduced during transmission of the information.

Because systems employing FEC can correct a limited number of errors, higher levels of signal degradation, and lower OSNR, can be tolerated before an unacceptable number of errors pass through the system. FEC provides a dual benefit in that FEC increases the system performance by decreasing the error rate of the system and decreases the system cost by allowing for greater distances between transmitters and receivers in the system.

While FEC can extend the transmission distance of the system, FEC encoding adds encoding bits to signal and increases the overall bit rate of the signal. The increased bit rate associated with FEC can increase the degradation of the optical signals by various mechanisms, thereby requiring that the transmitters and receivers be more closely spaced.

As the demand for transmission capacity continues to grow, there is an increasing need to efficiently use the available transmission capacity and protect the information being transported through the systems. In addition, the increased amount of traffic being carried on each fiber places increased importance on the ability to effectively protect the information, because each failure results in higher revenue losses for service providers. Accordingly, there is a need for optical transmission systems and protection schemes that have increased flexibility and reliability for use in optical communication systems.

BRIEF SUMMARY OF THE INVENTION

The present invention addresses the need for optical transmission systems, apparatuses, and methods having increased flexibility and reliability. Optical systems of the present invention include at least one optical transmitter configured to provide forward error correction ("FEC") encoding of information to be transmitted to corresponding optical receivers that provide for FEC decoding of the information. In various embodiments, the receiver threshold, amplitude and/or temporal, for distinguishing between ones and zeros in the received information is adjusted based on the number of errors, either one or zero, detected during decoding of the transmitted information. In particular, the receiver threshold is periodically or continually adjusted to maintain the number of one errors and the number of zero errors within a specific relationship. For example, a threshold adjustment circuit can be configured to adjust the receiver threshold such that the number of one errors equals the number of zero errors or is maintained within a given difference and total number criteria. In addition, the receiver filters, distortion compensation circuits, and signal launch powers can be adjusted to maintain a relationship between the number of one errors, zero errors, and total errors.

A network management system ("NMS") can track the number of one, zero, and total errors being corrected, either locally at the network element level or at higher network management levels. The system can be configured to perform protection switching of the information to an alternate communication path when a certain threshold for the number of errors corrected by FEC is exceeded. The protection switching can be performed automatically or upon prompting by the NMS. For example, automatic switching can initiated when a rapid increase in errors, above an error burst threshold, is detected that requires immediate intervention. Conversely, the NMS can notify the network operator of trends of increasing errors being corrected by the system. These embodiments allows protection switching to be planned and performed before degradation along the communication path actually results in diminished system performance.

In various embodiments, the transmitters and receivers are controlled to implement various levels of FEC encoding and decoding, respectively. The level of FEC encoding, and hence the bit rate of the information including FEC overhead, can be used to balance the error rate with the transmission distance to optimize the performance of the system. For example, the amount of FEC encoding can be reduced when few or no errors are being detected, thereby lowering the bit rate of the signal and extending the transmission distance of the information signal. Conversely, the FEC encoding level can be increased, when larger numbers of errors are being detected and corrected. The variable FEC technique provides an adapting coding technology that increases the level of system optimization.

Also, the FEC encoding can be configured to transmit additional information along with the information being encoded. For example, low frequency tones can be included in the FEC encoding to transmit low bandwidth information, such as channel identification, without having to receive and decode the information. Higher bandwidth information, such as system supervisory information and low bit rate payload information, can also be included in the FEC encoding as recovered at the receivers or signal monitors in the system. For example, a reboot command for a central processor ("CP") can be encoded along with the information being transmitted to the receiver. When the reboot command is decoded by the receiver and provided to the CP, the command will cause it to reboot.

Accordingly, the present invention addresses the aforementioned concerns by providing optical systems apparatuses, and methods having increased performance and reliability. These advantages and others will become apparent from the following detailed description.

BRIEF DESCRIPTION OF THE DRAWINGS

Embodiments of the present invention will now be described, by way of example only, with reference to the accompanying drawings for the purpose of illustrating embodiments only and not for purposes of limiting the same; wherein like members bear like reference numerals and.

DESCRIPTION OF THE INVENTION

Figure 1:
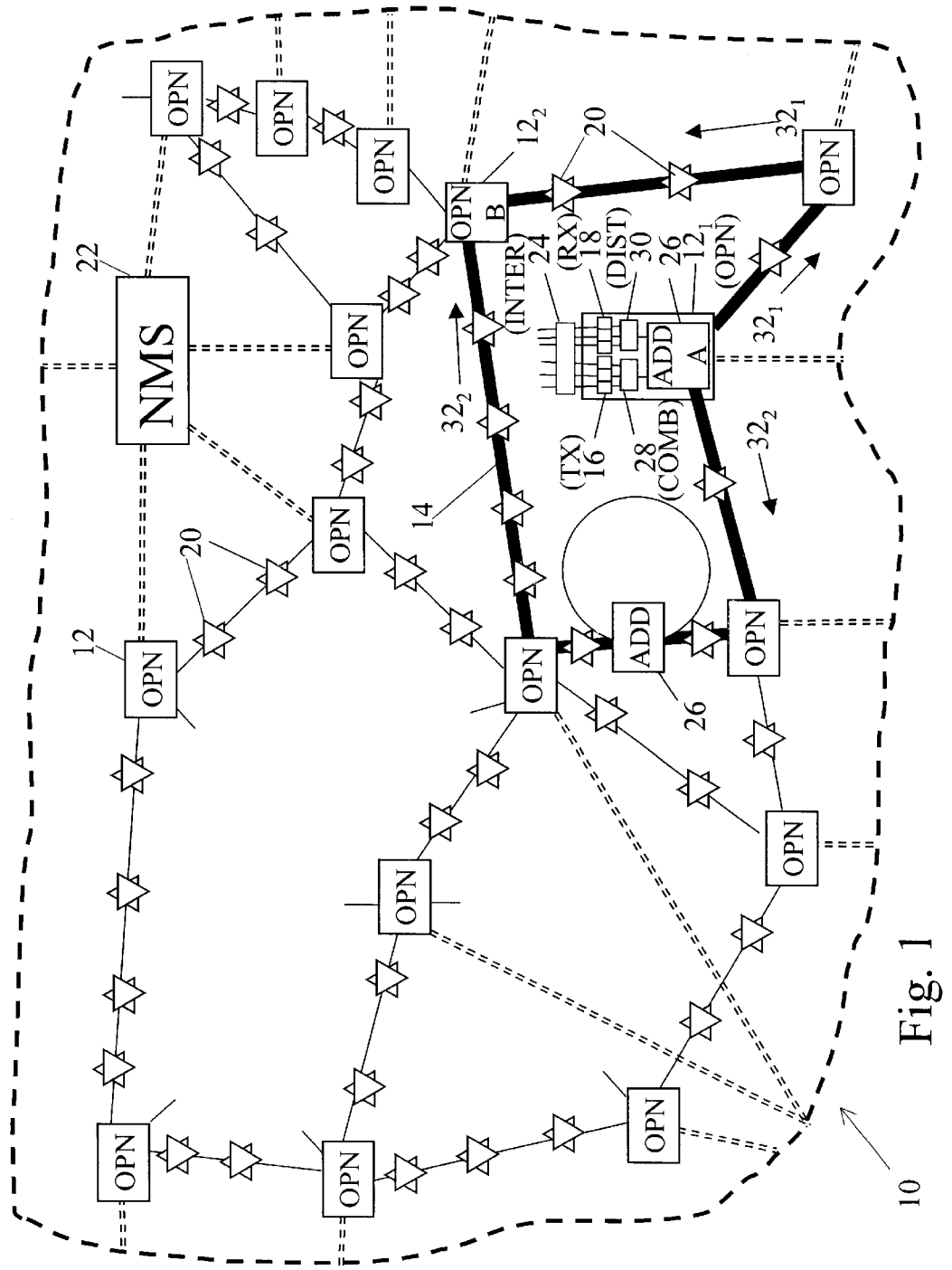
FIG. 1 shows an optical system network embodiment.

Optical systems 10 of the present invention include a plurality of optical processing nodes 12 interconnected by one or more guided or unguided optical transmission media 14, such as optical fiber. The optical processing nodes 12 include optical transmitters 16 configured to transmit information via optical signals in one or more information carrying signal wavelengths, or signal channels, $\lambda_i$ through the transmission media 14 to optical receivers 18 located in other processing nodes 14.

Optical amplifiers 20 can be disposed along the transmission fiber 14 to overcome attenuation in the fiber 14 and proximate the optical processing nodes 12 to overcome loss associated with the nodes 12, as required. The optical amplifiers 20 can include one or more serial or parallel amplifier stages. Distributed and concentrated/lumped, doped, e.g. erbium, and Raman fiber amplifier stages can be locally or remotely pumped with optical energy from a pump source. Semiconductor and other types of amplifier stages also can be included in the optical amplifiers 20, as well as various other stages for optical regeneration, dispersion compensation, etc.

Figure 2:
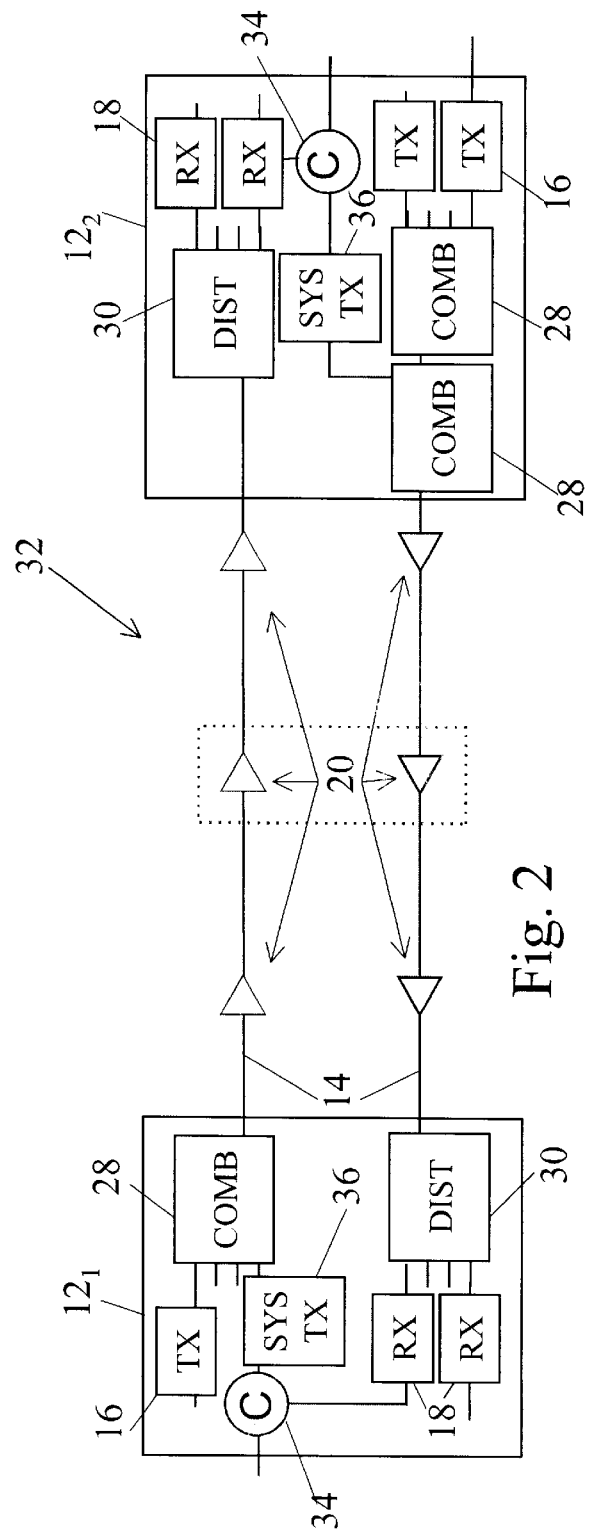
FIG. 2 shows at least one of a point to point system and a point to point link in a larger network, such as FIG. 1.

A network management-system ("NMS") 22 can be provided to configure the system 10 in multi-dimensional networks (FIG. 1) or in one or more point to point links interconnecting the nodes 12 (FIG. 2). Furthermore, the system 10 can be configured to provide uni-directional or bi-directional transmission in each fiber 14 and can employ the same or different wavelengths in each link between nodes 12.

The transmitters 16 used in the system 10 will generally include a narrow bandwidth laser optical source that provides an optical carrier. The transmitters 16 also can include other coherent narrow or broad band sources, such as sliced spectrum sources, as well as suitable incoherent optical sources as appropriate. Information can be imparted to the optical carrier either by directly modulating the optical source or by externally modulating the optical carrier emitted by the source. Alternatively, the information can be imparted to an electrical carrier that can be upconverted onto an optical wavelength to produce the optical signal. Electro-optic (e.g., $LiNbO_3$), electro-absorption, other types of modulators and upconverters can be used in the transmitters 16.

Similarly, the optical receiver 18 used in the present invention can include various detection techniques, such coherent detection, optical filtering and direct detection, and combinations thereof. Generally speaking, N transmitters 16 can be used to transmit M different signal wavelengths to J different receivers 18. Employing tunable transmitters 16 and receivers 18 in the optical nodes 12 in a network, such as in FIGS. 1–2, can provide additional versatility in the system 10.

The transmitters 16 and receivers 18 also can be directly connected to other electrical or optical systems. Alternatively, interfacial devices 24, such as electrical and optical cross-connect switches, IP routers, etc., can be used to interconnect the systems and provide interface flexibility at the periphery of and within the system 10. The interfacial devices 24 can be configured to receive, convert, and provide information in one or more various protocols, encoding schemes, and bit rates to the transmitters 16, and perform the converse function for the receivers 18. The interfacial devices 24 also can be used to provide protection switching in various nodes 12 depending upon the configuration. The interfacial devices 24 can be electrically connected to the transmitters 16 and receivers 18 or optically connected via short, intermediate, and/or long reach optical interfaces.

The optical processing nodes 12 may also include other optical components, such as one or more add/drop devices and optical switches/routers/cross-connects 26 optically interconnecting the transmitters 16 and receivers 18. For example, broadcast and/or wavelength reusable, add/drop devices, and optical and electrical/digital cross connect switches and routers can be configured via the network management system 22 in various topologies, i.e., rings, mesh, etc. to provide a desired network optical connectivity.

Optical combiners 28 can be provided to combine optical signals from different optical paths onto a common path, e.g. fiber. Likewise, optical distributors 26 can be provided to distribute optical signals from a common path to a plurality of different optical paths. The optical combiners 28 and distributors 30 can include wavelength selective and non-selective ("passive") fiber and free space devices, as well as polarization sensitive devices. Passive or WDM couplers/ splitters, circulators, dichroic devices, prisms, gratings, etc. can be used alone, or in combination with various tunable or fixed, high, low, or band pass or stop, transmissive or reflective filters, such as Bragg gratings, Fabry-Perot, Mach-Zehnder, and dichroic filters, etc. in various configurations of the optical combiners 28 and distributors 30. Furthermore, the combiners 28 and distributors 30 can include one or more serial or parallel stages incorporating various devices to multiplex, demultiplex, and multicast signal wavelengths $\lambda_i$ in the optical systems 10.

In various embodiments, the transmitters 16 and receivers 18 are configured to forward error correction ("FEC") encode and decode, respectively, the information transmitted through the system 10. FEC can be implemented using standard FEC techniques, such as Reed-Solomon and Cyclical Redundancy Checks ("CRC") encoding, as well as other techniques. For example, FEC can be encoded and decoded using conventional integrated circuits, such as are available from Vitesse Semiconductor Corporation and Applied Micro Circuits Corporation (AMCC).

Figure 3:
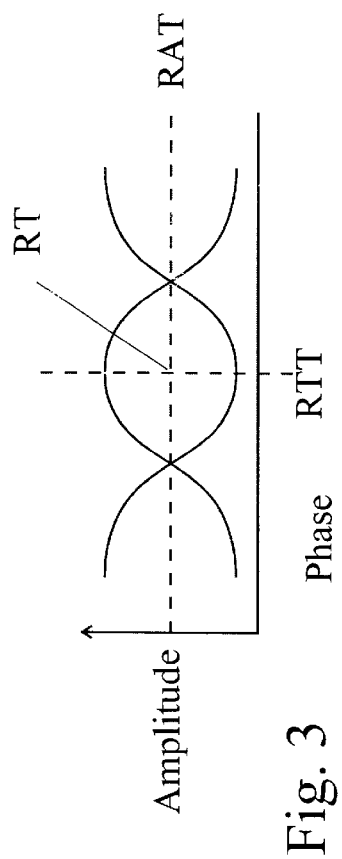
FIG. 3 shows an idealized eye pattern.

In various embodiments, the optical receivers 18 are configured to vary a receiver threshold ("RT"), such as voltage, current, phase, etc., for distinguishing between ones and zeros in the receiver based on the errors detected by the FEC decoding circuit. As shown in eye pattern of FIG. 3, a receiver amplitude threshold ("RAT") and/or temporal threshold ("RTT") can be adjusted to vary the RT in the receiver 18. The receiver threshold can be periodically or continually adjusted to maintain the number of one errors and the number of zero errors detected by the FEC decoding circuit within a specific relationship. The number of one errors and the number of zero errors being detected can be maintained based on various relationships, such as absolute or relative ratios and/or differences between the number of errors or error rates, other error imbalances, etc. For example, a threshold adjustment circuit can be configured to adjust the receiver threshold such that the number of one errors equals the number of zero errors. In various embodiments, the total number of errors also can be minimized in addition to, or in lieu of, maintaining other relationships between the number of one and zero errors.

In addition, other system parameters can be adjusted, or tuned, to maintain the relationship between the number of one errors, zero errors, and total errors corrected by FEC decoding. For example, filters used in the demultiplexers, receivers, etc. can be varied using conventional methods, such as thermally or mechanically tuning a Bragg grating, based on the number of corrected errors. Corrected error monitoring also can be used to adjust distortion compensation circuits in both the receivers 18 and transmitters 16, as well as the signal channel launch power of the transmitters 16.

The number of corrected errors can be tracked using various time intervals and counting methods. Typically, errors can be counted over an integration period including one or more integration increments. The counting of the corrected errors in the integration period can be performed by resetting to one and zero error counts to zero, or to an absolute of relative difference between the one and zero errors. For example, the minimum of the number of one errors and the number of zero errors can be subtracted from both to preserve the imbalance from the preceding period. A rolling integration period also can be used in which the corrected errors in the integration increments are retained individually and/or in sub-periods including plural integration increments. The number of corrected errors in the increments and/or sub-periods that are oldest in time, or meet other criteria, are subtracted as corresponding new increments and/or sub-periods are added. The skilled artisan can select the specific length of time corresponding to the integration increment and the integration period, as well as error counting methods.

In the present invention, the FEC encoding and decoding level is adaptively varied depending upon the number of errors that are present in the system. For example, in a Reed-Solomon system, the FEC encoding levels can be varied between 3 byte (255,249), 8 byte (255,239), and higher FEC levels, e.g., 100% overhead FEC embodiments, as may be desired in the system 10. When errors are not detected in a signal channel being transmitted through the system, the FEC encoding level can be decreased to lower the bit rate of the signal channel and increase the transmission distance. Likewise, the FEC encoding level can be increased to overcome higher levels of errors in the system 10. In this manner, the transmission distance and error rate can be optimized in the system 10. The FEC level for various transmission paths 32 can be varied following initial configuration, such as during system maintenance or reconfiguration, to optimize the system performance over time. It will generally be necessary to make changes to the FEC level during service shutdowns of the transmitters 16 and receivers 18 or configure the system to accommodate the transitional variations in the bit rate.

The FEC encoding can be further configured to include a data channel to allow additional information to be transmitted along with the information being encoded. System supervisory information and/or lower bit rate payload information can be transmitted on the FEC data channel. For example, the FEC data channel can carry system supervisory information that does not need to be modified along the transmission path 32 from the origin nodes 12, to the destination nodes 122. For example, if a NMS connection to the destination node 122 is not functional, communication to destination node 122 can be established from the origin node using the FEC data channel. Similarly, central processors ("CP") 34 reboot or other commands can be included in the FEC data channel. When the reboot and/or other commands are provided by receivers 18 at the destination and/or along the transmission path 32 to the CP 34, the commands will cause the CP 34 to reboot or execute the other commands.

In the present invention, one or more optical signal characteristics are monitored at the receiver 18 or at other points in the optical transmission path 32, i.e., at one or more amplifiers 20, nodes 12, or other tap locations. Network management 22 can monitor the signal characteristics over time to identify signal degradation in the various fiber paths 32. System supervisory information can be transmitted through the system 10 over one or more dedicated supervisory/service channel or using mixed supervisory/ payload channels that are dropped and added along the transmission path 32. As shown in FIG. 2, system transmitters 36 can be used to transmit information via the signal channel combiners 28 or a separate combiner at the nodes 12 to the amplifiers 20 and other nodes 12 along the path 32.

Figure 4:
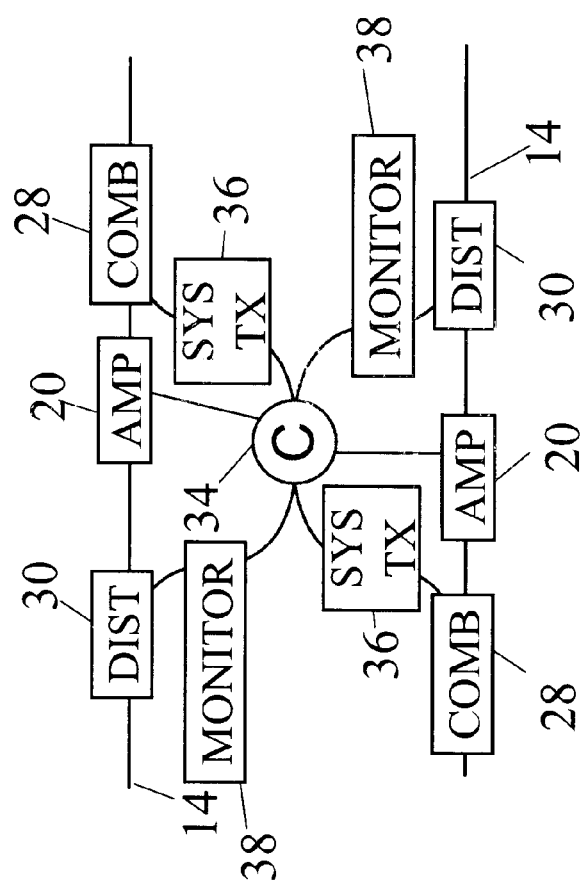
FIG. 4 shows a supervisory channel circuitry at an amplifier, such as in the dashed box in FIG. 2.

Monitoring at the receiver 18 can be performed for each received wavelength as part of the normal receiver functions and the receiver or node CP 34 can monitor the status of the channels. As shown in FIG. 4, signal monitors 38 also can be disposed along the optical path 32 at various monitoring points, such as amplifiers 20 sites shown by the dashed box in FIG. 2. The signal monitors 38 can include one or more fixed wavelength receivers 18 or tunable monitors, such as one or more wavelength tunable receivers or spectrum analyzers. The signal monitors 38 can be configured to perform FEC decoding of the one or more signal channels to follow the evolution of errors that have to be corrected along the transmission path 32. Corrected error monitoring and other signal performance monitoring, such as optical signal to noise ratio monitoring, can be used to identify the fibers 14 and spans in the system 10 where signal degradation is occurring. The signal monitoring information along the transmission path 32 can used to provision new optical paths to bypass only the degraded portions and specifically identify the degraded portions for service personnel.

System transmitters 36 can be provided in the amplifiers 20 to transmit FEC and other signal monitoring information from the amplifiers 20 to the NMS 22. The supervisory channel information can be transmitted in either or both directions via the available fibers 14 in the transmission path 32 and can be counter- and/or co-propagated with the signal channels in the system 10.

The network management system 22 can monitor the FEC corrected error and other signal monitoring information provided by the receivers 18 and signal monitors 38. The NMS 22 can be further configured to provision a new optical path $32_2$ between the originating transmitter in node A and destination receiver in node B, when signal quality in transmission path 32, exceeds an established criteria.

For example, when the corrected errors, error rate or imbalance, or other signal quality measure reaches a switch threshold value, the network management system 22 can provision the second optical path $32_2$ and the nodes 12 can switch traffic to the newly provisioned second optical path $32_2$. The provisioning and switching can be done in steps; for example by provisioning the second optical path $32_2$, when the quality measure reaches a provisioning threshold value, which precedes the switch value. Similarly, the CP 34, or another component in the system 10, can send an alarm to the NMS 22, when an alarm threshold value is reached. The NMS 22 or service provider personnel operating the NMS 22 can take the necessary steps to provision alternative paths.

Unlike SONET or other switching techniques that perform switching after errors have passed through the system, the present invention identifies system degradation using FEC corrected errors and provides for protection switching before any uncorrected errors pass through the system. This capability allows protection switching to be planned and performed before degradation along the communication path actually results in diminished system performance and loss of revenue.

In various embodiments employing FEC, signals can be detected and decoded at various monitoring points. FEC monitoring along the transmission path will help identify the source of errors in the transmission system 10. Error information collected along a transmission path can be used for the provisioning of an alternative optical path 322 before the signal degrades to the extent that it causes a service disruption.

The present invention can be deployed using 1+N, M:N, BLSR, and UPSR protection schemes or analogous schemes in various topologies. For example, in a 1+1 protection scheme, upon the detection of a degradation in a signal quality measure in a working optical path, a secondary protection path can be provisioned. The secondary protection path establishes 1+2 protection for traffic on the degrading working optical path. Upon provisioning of the secondary protection path, the receiver 18 at the destination can be switched to receive the optical signal from the primary protection path, which would become the new working path. The secondary protection path would become the primary protection path and the former working path could be taken off line for service without a disruption in service quality or protection except during the switching process.

In M:N protection schemes, a new optical path can be provision as described with 1+N schemes. However, in these schemes the traffic on the working optical path can be switched to either the primary protection path or to the newly provisioned optical path. If the traffic on the working path is switched to the newly provisioned path, the primary protection path can be maintained as the protection path.

The switching of the traffic on the working path to the newly provisioned path before a service disruption provides for increased service quality on M:N protected systems. The quality of service is increased, because it is less likely that lower priority traffic that can be run on the primary protection path will have to be disrupted. In addition, switching the working path to the newly provisioned path avoids having to reassign any other working paths that share primary protection path in M:N schemes. Alternatively, any lower priority traffic on the primary protection path can be switched to the newly provisioned path and the working path switched to the primary protection path.

In provisioning optical paths, differences in path lengths can result in a loss of information when switching is performed. Introducing a delay in one or more of the paths can offset the path difference. The delay can be electronically introduced to provide flexibility in selecting paths to be provisioned. An additional delay can also be introduced to provide for "hitless" switching to the protection path.

Those of ordinary skill in the art will appreciate that numerous modifications and variations that can be made to specific aspects of the present invention without departing from the scope of the present invention. It is intended that the foregoing specification and the following claims cover such modifications and variations.

What is claimed is:

1. A method of transmitting an optical signal comprising:

encoding an optical signal using forward error correction;

transmitting the encoded optical signal through a first optical transmission path;

decoding the optical signal using forward error correction to correct errors in the optical signal; and monitoring the decoding of the optical signal to determine the number of one errors and zero errors, wherein said monitoring includes monitoring zero errors and one errors in the optical signal corrected during decoding of the encoded optical signal, and wherein monitoring includes resetting the number of zero errors and one errors when an integration period begins, wherein said resetting includes subtracting the lesser of the number of zero errors and the number of one errors from the number of zero errors and from the number of one errors when the integration period begins; and varying a receiver threshold to maintain a specific relationship between the one errors and the zero errors.

2. The method of claim 1, wherein said monitoring includes providing a signal degradation alarm to the network management system when the number of corrected errors exceeds an alarm threshold value.

3. The method of claim 1, wherein said varying includes varying the receiver threshold to maintain an equal number of one errors and zero errors.

4. The method of claim 1, wherein said monitoring includes monitoring zero errors and one errors in the optical signal corrected during decoding of the encoded optical signal during an integration period and varying a receiver threshold to maintain a specific relationship between the one errors and the zero errors.

5. A method of transmitting an optical signal comprising:

encoding an optical signal using forward error correction;

transmitting the encoded optical signal through a first optical transmission path;

decoding the optical signal using forward error correction to correct errors in the optical signal;

monitoring the decoding of the optical signal to determine the number of one and zero errors; and, varying a receiver threshold to maintain a specific relationship between the one errors and zero errors, wherein said encoding includes encoding the optical signal using forward error correction at a first error correction level;

said decoding includes decoding the forward error correction encoded optical signal at the first error correction level;

said method includes varying said encoding and decoding of the optical signal using forward error correction at a second error correction level; and said varying includes varying the encoding and decoding of the optical signal to maximize the first transmission path length at a bit error rate set point.

* * * * *